United States Patent
Bodog et al.

(10) Patent No.: US 10,231,143 B2
(45) Date of Patent: Mar. 12, 2019

(54) METHOD AND APPARATUS FOR USE IN MDT DATA COLLECTION

(71) Applicant: NOKIA SOLUTIONS AND NETWORKS OY, Espoo (FI)

(72) Inventors: Gyula Bodog, Budapest (HU); Sean Kelley, Hoffman Estates, IL (US); Yi Zhang, Beijing (CN); Anatoly Andrianov, Schuamburg, IL (US)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 0 days.

(21) Appl. No.: 14/383,312

(22) PCT Filed: Mar. 14, 2013

(86) PCT No.: PCT/EP2013/055223
§ 371 (c)(1),
(2) Date: Sep. 5, 2014

(87) PCT Pub. No.: WO2013/135805
PCT Pub. Date: Sep. 19, 2013

(65) Prior Publication Data
US 2015/0045014 A1     Feb. 12, 2015

Related U.S. Application Data

(60) Provisional application No. 61/611,741, filed on Mar. 16, 2012.

(51) Int. Cl.
*H04W 4/00* (2018.01)
*H04W 24/10* (2009.01)
(Continued)

(52) U.S. Cl.
CPC .......... *H04W 24/10* (2013.01); *H04W 24/08* (2013.01); *H04W 16/18* (2013.01)

(58) Field of Classification Search
CPC ...................................................... H04W 24/10
(Continued)

(56) References Cited

U.S. PATENT DOCUMENTS

| 6,609,001 B2 * | 8/2003 | Kline ................. H04B 17/309 |
| | | 455/423 |
| 8,724,497 B2 * | 5/2014 | Johansson ............ H04W 24/10 |
| | | 370/252 |

(Continued)

FOREIGN PATENT DOCUMENTS

| CN | 101998463 A | 3/2011 |
| CN | 102378221 A | 3/2012 |
| WO | WO 2011/050846 A1 | 5/2011 |

OTHER PUBLICATIONS

3GPP TS 25.413 V10.4.0 (Dec. 2011) 3rd Generation Partnership Project; Technical Specification Group Radio Access Network; UTRAN Iu interface Radio Access Network Application Part (RANAP) signaling (Release 10).

(Continued)

*Primary Examiner* — David Q Nguyen
(74) *Attorney, Agent, or Firm* — Squire Patton Boggs (US) LLP

(57) ABSTRACT

According to an embodiment there is provided a method comprising; collecting a first type of measurement and a second type of measurement, said first and second types of measurement being used together by an entity; and causing values of said first type of measurement to be sent with associated values of said second type of measurement to be sent.

20 Claims, 2 Drawing Sheets

(51) Int. Cl.
*H04W 24/08* (2009.01)
*H04W 16/18* (2009.01)

(58) Field of Classification Search
USPC .......... 455/422.1, 423, 115.1, 67.11, 226.1; 370/252
See application file for complete search history.

(56) References Cited

U.S. PATENT DOCUMENTS

| | | | |
|---|---|---|---|
| 2011/0201324 A1 | 8/2011 | Persson et al. | |
| 2011/0250880 A1 | 10/2011 | Olsson | |
| 2011/0306345 A1 | 12/2011 | Wu | |
| 2012/0044822 A1* | 2/2012 | Kim | H04W 24/10 370/252 |
| 2012/0113837 A1* | 5/2012 | Siomina | H04W 24/10 370/252 |

OTHER PUBLICATIONS

3GPP TS 32.441 V11.0.0 (Dec. 2011) 3rd Generation Partnership Project; Technical Specification Group Services and System Aspects; Telecommunication management;Trace Management Integration Reference Point (IRP); Requirements (Release 11).
3GPP TS 32.442 V11.1.0 (Dec. 2011) 3rd Generation Partnership Project; Technical Specification Group Services and System Aspects; Telecommunication management; Trace Management Integration Reference Point (IRP); Information Service (IS) (Release 11).
3GPP TS 32.443 V9.1.0 (Mar. 2011) 3rd Generation Partnership Project; Technical Specification Group Services and System Aspects; Telecommunication management; Trace Management Integration Reference Point (IRP): Common Object Request Broker Architecture (CORBA) Solution Set (SS) (Release 9).
3GPP TS 32.445 V9.1.0 (Dec. 2009) 3rd Generation Partnership Project; Technical Specification Group Services and System Aspects; Telecommunication management; Trace Management (Trace) Integration Reference Point (IRP): eXtensible Markup Language (XML) file format definition (Release 9).
3GPP TS 32.422 V10.6.0 (Dec. 2011) 3rd Generation Partnership Project; Technical Specification Group Services and System Aspects; Telecommunication management; Subscriber and equipment trace; Trace control and configuration management (Release 10).
3GPP TS 32.423 V11.0.0 (Dec. 2011) 3rd Generation Partnership Project; Technical Specification Group Services and System Aspects; Telecommunication management; Subscriber and equipment trace; Trace data definition and management (Release 11).
3GPP TS 36.413 V10.4.0 (Dec. 2011) 3rd Generation Partnership Project; Technical Specification Group Radio Access Network; Evolved Universal Terrestrial Radio Access Network (E-UTRAN); S1 Application Protocol (S1AP) (Release 10).
3GPP TS 36.423 V10.4.0 (Dec. 2011) 3rd Generation Partnership Project; Technical Specification Group Radio Access Network; Evolved Universal Terrestrial Radio Access Network (E-UTRAN); X2 application protocol (X2AP) (Release 10).
3GPP TS 25.423 V10.5.0 (Dec. 2011) 3rd Generation Partnership Project; Technical Specification Group Radio Access Network; UTRAN Iur interface Radio Network Subsystem Application Part (RNSAP) signaling (Release 10.
International Search Report and Written Opinion dated Jun. 12, 2013 corresponding to International Patent Application PCT/EP2013/055223.
"3rd Generation Partnership Project; Technical Specification Group Radio Access Network; Study on Minimization of drive-tests in Next Generation Networks; (Release 9)", 3GPP Draft, Technical Specification, R2-096290, 3GPP TR 36.805 V1.2.1, Oct. 1, 2009.
Chinese Office Action dated Jul. 5, 2017, issued in corresponding CN Application No. 201380014536.2.

* cited by examiner

METHOD AND APPARATUS FOR USE IN MDT DATA COLLECTION

FIELD OF SOME EMBODIMENTS

Some embodiments relate to methods and apparatus and in particular but not exclusively to methods and apparatus for use in data collection.

BACKGROUND

A communication system can be seen as a facility that enables communication sessions between two or more entities such as user terminals, base stations and/or other nodes by providing carriers between the various entities involved in the communications path. A communication system can be provided for example by means of a communication network and one or more compatible communication devices. The communications may comprise, for example, communication of data for carrying communications such as voice, electronic mail (email), text messages, multimedia and/or content data and so on. Non-limiting examples of services provided include two-way or multi-way calls, data communication or multimedia services and access to a data network system, such as the Internet.

In a wireless communication system at least a part of communications between at least two stations occurs over a wireless link. Examples of wireless systems include public land mobile networks (PLMN), satellite based communication systems and different wireless local networks, for example wireless local area networks (WLAN). The wireless systems can typically be divided into cells, and are therefore often referred to as cellular systems.

A user can access the communication system by means of an appropriate communication device or terminal. A communication device of a user is often referred to as user equipment (UE). A communication device is provided with an appropriate signal receiving and transmitting apparatus for enabling communications, for example enabling access to a communication network or communications directly with other users. The communication device may access a carrier provided by a station, for example a base station of a cell, and transmit and/or receive communications on the carrier.

The communication system and associated devices typically operate in accordance with a given standard or specification which sets out what the various entities associated with the system are permitted to do and how that should be achieved. For example, it can be defined if carrier aggregation is used. Communication protocols and/or parameters which shall be used for the connection are also typically defined. An example of attempts to solve the problems associated with the increased demands for capacity is an architecture that is known as the long-term evolution (LTE) of the Universal Mobile Telecommunications System (UMTS) radio-access technology. The LTE is being standardized by the $3^{rd}$ Generation Partnership Project (3GPP). The various development stages of the 3GPP LTE specifications are referred to as releases. A further development of the LTE is referred to as LTE-Advanced (LTE-A).

SUMMARY

According to an embodiment there is provided a method comprising: collecting a first type of measurement and a second type of measurement, said first and second types of measurement being used together by an entity; and causing values of said first type of measurement to be sent with associated values of said second type of measurement to be sent.

The method may be performed by a radio network element or a user equipment. The radio network element may be a base station, a radio network controller or an eNodeB.

The method may be such that a value of the first type of measurement is sent only if the associated value of the second type of measurement is available.

The first type of measurement may be a primary measurement and the second type of measurement may be a secondary measurement.

The method may comprise receiving information indicating for at least one type of information if that type of information is a primary or a secondary measurement.

The method may comprise only collecting said second type of measurement if said first type of measurement is available.

The method may comprise causing a value of the first type of measurement to be sent with the associated value of the second type of measurement and additional information.

The additional information may be one or more of a time stamp, cell identity, trace reference or trace recording session reference.

The method may comprise collecting a plurality of different values of one of said first and second types of measurement which are associated with one or more values of the other of said first and second types of measurement.

The first type of measurement may comprise at least one of power headroom measurements, throughput measurements, quality of service measurements, reference signal received power measurements and reference signal received quality measurements, and measurement data.

The second type of measurement may comprise at least one of received interference power and location.

The method may be used when performing an MDT job.

A computer program comprising program code means adapted to perform the method may also be provided. The computer program may be stored and/or otherwise embodied by means of a carrier medium.

According to another embodiment, there is provided an apparatus comprising at least one processor and at least one memory including computer code for one or more programs, the at least one memory and the computer code configured, with the at least one processor, to cause the apparatus at least to: collect a first type of measurement and a second type of measurement, said first and second types of measurement being used together by an entity; and cause values of said first type of measurement to be sent with associated values of said second type of measurement to be sent.

The apparatus may be provided by or in a radio network element or a user equipment. The radio network element may be a base station, a radio network controller or an eNodeB.

The at least one memory and the computer code may be configured, with the at least one processor, to cause the apparatus to cause a value of the first type of measurement to be sent only if the associated value of the second type of measurement is available.

The first type of measurement may be a primary measurement and the second type of measurement may be a secondary measurement.

The at least one memory and the computer code may be configured, with the at least one processor, to cause the apparatus to receive information indicating for at least one type of information if that type of information is a primary or a secondary measurement.

The at least one memory and the computer code may be configured, with the at least one processor, to cause the apparatus to only collect said second type of measurement if said first type of measurement is available.

The at least one memory and the computer code may be configured, with the at least one processor, to cause the apparatus to cause a value of the first type of measurement to be sent with the associated value of the second type of measurement and additional information.

The additional information may be one or more of a time stamp, cell identity, trace reference or trace recording session reference.

The at least one memory and the computer code may be configured, with the at least one processor, to cause the apparatus to collect a plurality of different values of one of said first and second types of measurement which are associated with one or more values of the other of said first and second types of measurement.

The first type of measurement may comprise at least one of power headroom measurements, throughput measurements, quality of service measurements, reference signal received power measurements and reference signal received quality measurements, and measurement data.

The second type of measurement may comprise at least one of received interference power and location.

According to another embodiment there is provided an apparatus comprising: means for collecting a first type of measurement and a second type of measurement, said first and second types of measurement being used together by an entity; and means for causing values of said first type of measurement to be sent with associated values of said second type of measurement to be sent.

The apparatus may be provided by or in a radio network element or a user equipment. The radio network element may be a base station, a radio network controller or an eNodeB.

The means for causing may be for causing a value of the first type of measurement to be sent only if the associated value of the second type of measurement is available.

The first type of measurement may be a primary measurement and the second type of measurement may be a secondary measurement.

The apparatus may comprise means for receiving information indicating for at least one type of information if that type of information is a primary or a secondary measurement.

The collecting means may be for only collecting said second type of measurement if said first type of measurement is available.

The causing means may be for causing a value of the first type of measurement to be sent with the associated value of the second type of measurement and additional information.

The additional information may be one or more of a time stamp, cell identity, trace reference or trace recording session reference.

The collection means may be for collecting a plurality of different values of one of said first and second types of measurement which are associated with one or more values of the other of said first and second types of measurement.

The first type of measurement may comprise at least one of power headroom measurements, throughput measurements, quality of service measurements, reference signal received power measurements and reference signal received quality measurements, and measurement data.

The second type of measurement may comprise at least one of received interference power and location.

A user equipment may comprise an apparatus as previously described.

A radio network element may comprise an apparatus as previously described.

BRIEF DESCRIPTION OF DRAWINGS

Some embodiments will now be described, by way of example only, with reference to the following examples and accompanying drawings in which.

DESCRIPTION OF EMBODIMENTS

In the following description certain exemplifying embodiments are explained with reference to wireless or mobile communication systems serving mobile communication devices. A wireless communication system and mobile communication device are briefly explained with reference to FIGS. 1 and 2.

A communication device can be used for accessing various services and/or applications provided via a communication system. In wireless or mobile communication systems the access is provided via a wireless access interface between mobile communication devices 1 and an appropriate access system 10. A mobile device 1 can typically access wirelessly a communication system via an access node such as at least one base station 12 or similar wireless transmitter and/or receiver node of the access system. A base station site typically provides one or more cells of a cellular system. In the FIG. 1 example the base station 12 is configured to provide a cell, but could provide, for example, three sectors, each sector providing a cell. Each mobile device 1 and base station may have one or more radio channels open at the same time and may receive signals from more than one source.

Figure 1:
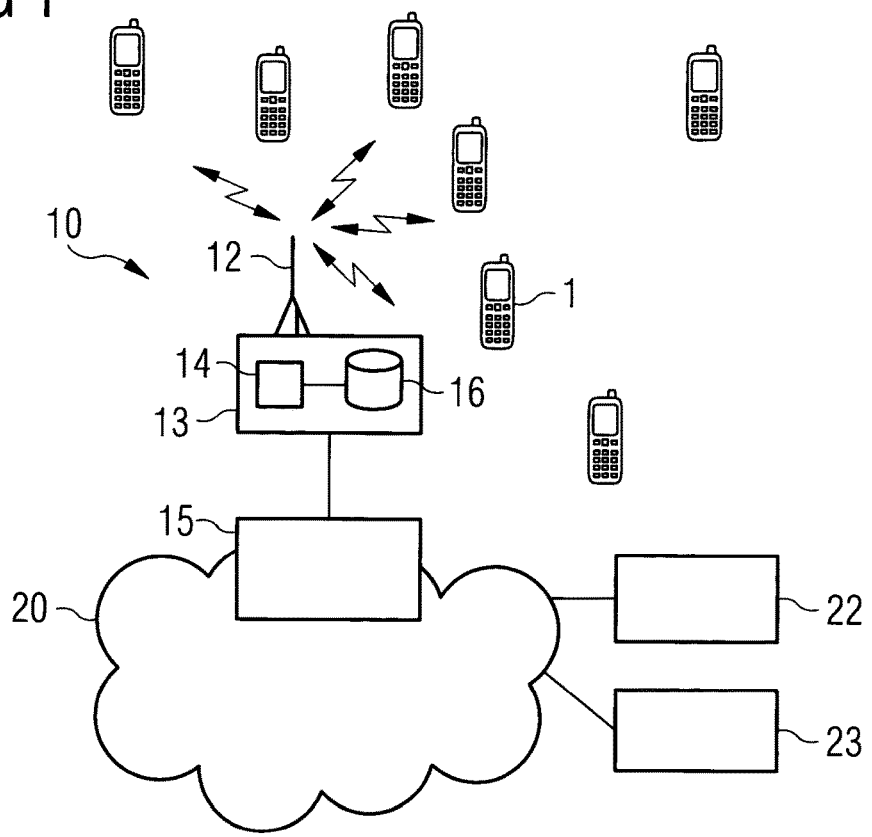
FIG. 1 shows an example of a communication system in which some embodiments of the may be implemented.

A base station is typically controlled by at least one appropriate controller so as to enable operation thereof and management of mobile communication devices in communication with the base station. The control entity can be interconnected with other control entities. In FIG. 1 the controller is shown to be provided by block 13. An appropriate controller apparatus may comprise at least one memory 16, at least one data processing unit 14 and an input/output interface. The controller may be provided with memory capacity and at least one data processor. It shall be understood that the control functions may be distributed between a plurality of controller units. The controller apparatus for a base station may be configured to execute an appropriate software code to provide the control functions as explained below in more detail. The control entity may be separate from or part of the base station.

In the example shown in FIG. 1, the base station node 12 is connected to a data network 20 via an appropriate gateway 15. A gateway function between the access system and another network such as a packet data network may be provided by means of any appropriate gateway node, for example a packet data gateway and/or an access gateway. A communication system may thus be provided by one or more interconnect networks and the elements thereof, and one or more gateway nodes may be provided for interconnecting various networks. In some embodiments the base station node is an eNodeB.

A trace collection entity TCE 22 is provided. In FIG. 1, the trace collection entity is shown as being connected via the data network. However, in alternative embodiments, the trace collection entity may be arranged to communicate more directly with the controller 13 and/or may be part of the same network as the controller.

An OAM entity 23 is shown as being connected to the data network. The operation administration and maintenance OAM entity 23 may be provided elsewhere in the system. The OAM entity may be arranged to communicate with one or more networks. The OAM entity may be arranged to receive information from the TCE 22.

A communication device can be used for accessing various services and/or applications. The communication devices can access the communication system based on various access techniques, such as code division multiple access (CDMA), or wideband CDMA (WCDMA). The latter technique is used by communication systems based on the third Generation Partnership Project (3GPP) specifications. Other examples include time division multiple access (TDMA), frequency division multiple access (FDMA), space division multiple access (SDMA) and so on. A non-limiting example of mobile architectures where the herein described principles may be applied is known as the Evolved Universal Terrestrial Radio Access Network (E-UTRAN).

Non-limiting examples of appropriate access nodes are a base station of a cellular system, for example what is known as NodeB or enhanced NodeB (eNB) in the vocabulary of the 3GPP specifications. The eNBs may provide E-UTRAN features such as user plane Radio Link Control/Medium Access Control/Physical layer protocol (RLC/MAC/PHY) and control plane Radio Resource Control (RRC) protocol terminations towards mobile communication devices. Other examples include base stations of systems that are based on technologies such as wireless local area network (WLAN) and/or WiMax (Worldwide Interoperability for Microwave Access).

Figure 2:
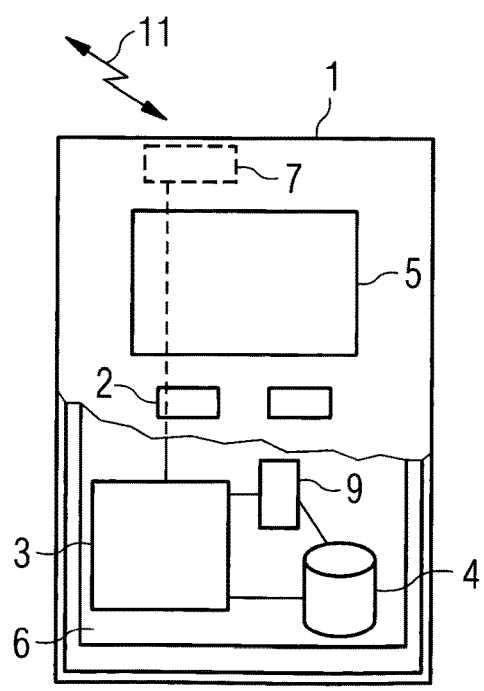
FIG. 2 shows an example of a communication device.

FIG. 2 shows a schematic, partially sectioned view of a communication device 1 that can be used for communication on carrier 11 with at least one other wireless station. An appropriate mobile communication device may be provided by any device capable of sending and receiving radio signals. Such a communication device may be referred to as a user equipment UE. Non-limiting examples include a mobile station (MS) such as a mobile phone or smart phone, a portable computer provided with a wireless interface card or other wireless interface facility, personal data assistant (PDA) provided with wireless communication capabilities, or any combinations of these or the like. The communication device or UE may in some embodiments be stationary and generally fixed in position.

A communication device may be used for voice and video calls, for accessing service applications provided via a data network. The device 1 may receive signals via appropriate apparatus for receiving and transmitting radio signals on wireless carriers, or radio bearers. In FIG. 2 a transceiver is designated schematically by block 7. The transceiver may be provided for example by means of a radio part and associated antenna arrangement. The antenna arrangement may be arranged internally or externally to the mobile device. A mobile device is also typically provided with at least one data processing entity 3, at least one memory 4 and other possible components 9 for use in tasks it is designed to perform. The data processing, storage and other entities can be provided on an appropriate circuit board and/or in chipsets. This feature is denoted by reference 6. The user may control the operation of the mobile device by means of a suitable user interface such as key pad 2, voice commands, touch sensitive screen or pad, combinations thereof or the like. A display 5, a speaker and a microphone are also typically provided. Furthermore, a mobile device may comprise appropriate connectors (either wired or wireless) to other devices and/or for connecting external accessories, for example hands-free equipment, thereto.

Some embodiments may be implemented in an LTE system, for example the LTE-A system. Of course other embodiments may be used with other releases of the LTE standard. Yet further embodiments may be used with the standards other than the LTE standard.

Minimisation of drive tests MDT may enable the operator to use the existing subscriber (user equipment) population for network optimisation. It has been suggested that MDT be used for coverage optimisation or any further optimization of the network. For example, coverage mapping may be considered to identify weak signal areas, coverage holes, pilot pollution or the like.

It has been suggested that the operation administration and maintenance (OAM) entity initiate an MDT job to the base station. According to the MDT configuration associated with that job, the base station will configure the user equipment to periodically or when a certain event happens report measurements along with the location coordinates. The measurement reports may be RSRP/RSRQ (reference signal received power/reference signal received quality).measurements. The location coordinates may be obtained by for example GNSS or in any suitable manner. The radio access network may collect this information into trace files and send these trace files to a trace collection entity (TCE) for processing. MDT may also support additional functions. For example, MDT may be used for uplink coverage optimisation, determining the cause of weak uplink coverage, and/or uplink/down link throughput mapping.

In some proposals, each additional functionality may require additional user equipment and/or base station measurements which need to be collected by the radio access network and sent to the TCE.

In some proposals more and more measurements are being defined within an MDT job. Some measurements may only be useful when coupled together with specific other measurements. By way of example, uplink received interference power (RIP) measurements may only be required for associated up link power headroom (PH) measurements and may not be useful by themselves. With some proposals, there may be cases where multiple sets of measurements are collected asynchronously but only a subset of the measurements are used for optimisation purposes. By way of example, the throughput measurements may only be useful in association with location information obtained by some means such as contained in RRC (radio resource control) measurement report messages or in any other way. Further, with some proposals, delivery of specific MDT measurements to the TCE may be delayed compared to other MDT measurements with which it is intended to be coupled. For example, medium access control (MAC) layer measurements may be stored in a separate trace file from the RRC layer measurements and may be delivered to the TCE with a significant delay compared to the RRC layer measurements. If all the measurement samples are delivered to the TCE, including data which may not be useful for analysis, the TCE may be potentially overloaded with a large quantity of data. Further, it may be necessary to perform additional processing at the TCE in order to perform the required correlation to associate data that should be coupled and/or filter out data which is not required.

Currently, the TCE may have a relatively high processing requirement. This is because if separate sets of data are processed at the TCE, the individual sets of measurement data may need to be correlated based on the combination of trace reference and/or trace recording session reference and/or cell identity and/or timestamp values in order to associate data that should be analyzed together. The current requirements for user identity anonymity means that correlation based on the user equipment identity cannot be performed. Only after the correlation has been performed, can filtering, which reduces the data, be performed.

Some embodiments provide a base station which intelligently gathers data by associating relevant combinations of data into single records and discarding or not using the data which is not required. This may mean that the processing requirements at the TCE may be reduced. Some embodiments may reduce the possibility of the loss of useful data.

In some embodiments, primary measurements and secondary measurements are provided. When an MDT job is created, each measurement in the MDT configuration is provided with an attribute which indicates whether the measurement is a primary measurement or a secondary measurement. The mapping relationship between one primary measurement and its one or more secondary measurements are shown or indicated in the MDT configuration. For some measurements, the attribute of primary or secondary may be implemented as changeable. The secondary measurements are collected only when the associated primary measurement data is available and determined to be reported to the TCE. For example, the primary measurement reporting serves as a trigger for the secondary measurement reporting. The secondary measurements are reported together with the primary measurements in the same record.

For example, the received interference power measurement can be a secondary measurement. The power headroom measurement can be a primary measurement. Further, there can be an indication which provides information as to the relationship between a particular secondary measurement and the associated primary measurement. The primary/secondary relationship may be standardized or configured as part of the MDT job configuration.

For example, the RIP measurement is useful in some MDT jobs only if the PH measurement from the same or related time interval is also available. As the power headroom measurements can only be sent by the user equipment in the subframes where there is for example a PUSCH transmission, this means that most RIP measurements made by the base station do not need to be sent to the TCE. By associating the applicable RIP measurement with the PH measurement in the same record, there is no need for the TCE to parse through large amounts of raw data to determine which pieces of data should be interpreted together. In other words, where more than one piece of data is required in order to perform a particular MDT job, those pieces of data are associated together and may be sent together to the TCE by the base station or RNC In some embodiments, the location information can be the secondary data. This is because the location information on its own may not be useful. However, it may be used where it is associated with measurement data. The associated measurement data would be considered to be a primary measurement.

Figure 3:
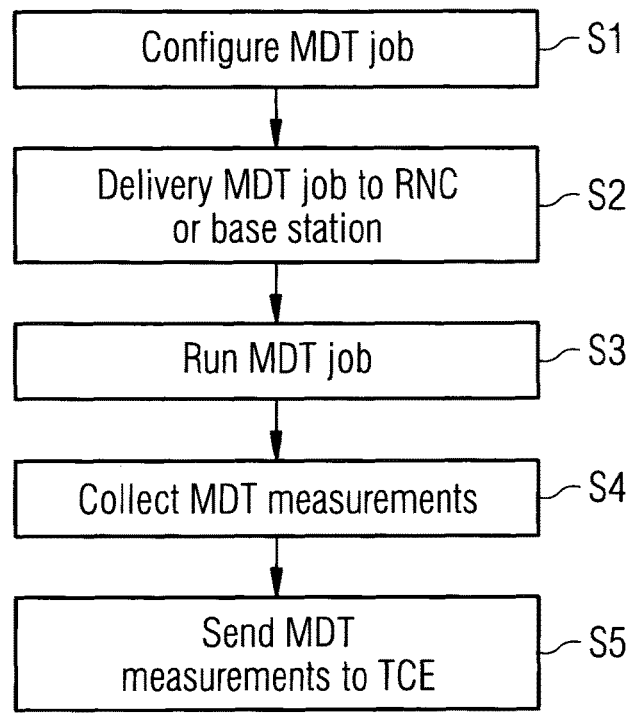
FIG. 3 shows a flow diagram of a method.

Reference is made to FIG. 3 which shows a method.

When an MDT job is created, the list of measurements that should be collected as part of the MDT job should be configured. This is as shown in step S1.

In some embodiments, the configuration may be determined by the OAM. In other embodiments, any other suitable control entity may configure the required MDT job. In some embodiments, a base station may configure the MDT job. In some embodiments, configuration of the MDT job involves not only defining the list of measurements but also if the measurement is a secondary or a primary measurement. Depending on the complexity of the MDT job, it may be sufficient to define a measurement as being a primary measurement or a secondary measurement. However, in more complex MDT jobs, it may be necessary to define, for example each secondary measurement, the one or more primary measurements with which it is associated. Alternatively or additionally it may be necessary to define for each primary measurement, the one or more secondary measurements with which it is associated.

In step S2, the configured MDT job is if necessary delivered to the base station and/or radio network controller. This is performed in step S2.

The MDT job is then run in step S3. Depending on the nature of the MDT job, the base station may need to send one or more messages to the user equipment. These one or more messages may control one or more measurements performed by a user equipment and reported to the base station. In some embodiments, one or more of the MDT measurements performed by a user equipment may already be reported to the base station.

In step S4, the base station collects the MDT measurements. In some embodiments, the secondary measurements are recorded in an MDT only where the associated primary measurement data is also available. In some embodiments, the base station may record all secondary measurements and periodically filter those secondary measurements so that only valid secondary measurements for which the associated primary measurement data is available are used.

In some embodiments, the MDT measurements are sent to the TCE, in step S5. The measurements may be sent in an MDT file or in any other suitable way. In some embodiments, the MDT measurements may be sent additionally or alternatively to one or more other entities.

In some embodiments, the MDT measurements are sent in MDT file. The MDT file may have a format which allows the storage of related primary and secondary measurements. In some embodiments, there may be a one to one relationship between a particular primary measurement and a particular secondary measurement. In other embodiments, one primary measurement may be associated with two or more different types of secondary measurements. In some embodiments, one or more secondary measurements may be associated with one or more primary measurements. In some embodiments, one value of a primary measurement may be associated with one value of a secondary measurement. However, in some embodiments, one primary measurement value may be associated with two or more values of a secondary measurement and/or two or more values of a primary measurement may be associated with one or more values of a secondary measurement. In some embodiments a secondary measurement may be associated with its own secondary measurements (e.g. a nested structure where a primary measurement has associated secondary measurements, any of the secondary measurements may have associated tertiary measurements, etc. . . . ).

The MDT data file or the like may contain in addition to the primary and secondary measurements information such as a timestamp or the like as a record structure. In some embodiments, the MDT data file may contain location information. The location information may be primary and/or secondary data and/or additional data.

In some embodiments, the correlation processing required at the TCE may be reduced. Further, additional processing power may not be required at the base station or RNC as the primary and secondary measurements may be stored within the UE context and the secondary measurements will be written to the MDT file with the primary measurement that triggered the secondary measurement. Thus, correlation is not required. In other words, a measurement is only written to the MDT file if the necessary primary and secondary information is available.

Some embodiments have referred to the concept of a primary and secondary measurement. In alternative embodiments, a mapping between the two or more measurements required may be instead used. In other words, measurement A and measurement B will only be recorded in the MDT file if both measurement A and measurement B are present.

It should be appreciated more complex MDT structures may be used which require more than two types of measurement. More complex measurement relations may include the following examples: measurement B may be considered as secondary measurement for a primary measurement A, measurement C may be considered as secondary for a primary measurement B (multi-tier nested relations); or measurement C may be considered as secondary to both primary measurements A and B; or measurements B and C both may be considered as secondary to the same primary measurement A. These are just some possible examples and it should be appreciated that other embodiments may other relationships between the measurements. Those different types of measurements are linked such that they are only sent to the TCE or the like if all of the required different types of measurements are present.

Some embodiments may use Immediate reporting. Immediate MDT reporting means that a UE collects and reports MDT measurements while in the connected mode. The connected mode occurs, for example, when the UE is on a call or has an active data connection to, for example, the Internet.

Alternatively or additionally Logged MDT reporting may be used. In Logged MDT reporting, a UE in an idle mode will make some MDT measurements, and store them in a log which the UE will report to the base station when the UE connects again to the network. The idle mode occurs when the UE is switched on and not actively connected to the network.

In some embodiments, the association of the primary and secondary measurements (and the alternatives previously described) may be carried out at the UE. For example, in logged MDT case, there may be a rule/logic at the UE that would ensure that certain measurements are only reported as groups (A reported only when B is available) or the like.

The measurements made by the UE when in the idle mode relate to the serving cell and/or neighboring cells. These measurements may be of any suitable parameter such as signal strength of the respective cell as received at the UE. The signal strength of a reference signal, for example a pilot signal, may be measured. Alternatively or additionally interference information may be determined by the UE. The UE may be arranged to provide one or more types of measurement information for one or more cells. The embodiments described above have had the MDT measurements taking place in the idle mode. Alternatively or additionally, the measurements may be made at other times, for example where the UE is in connected mode. In this alternative, reporting would take place in a similar manner, as described previously When the UE becomes active, after being in the idle mode, the UE indicates the availability of stored logged MDT reports to the network. When the network gets this information, the network will initiate the UE to report logged MDT reports to network.

Figure 4:
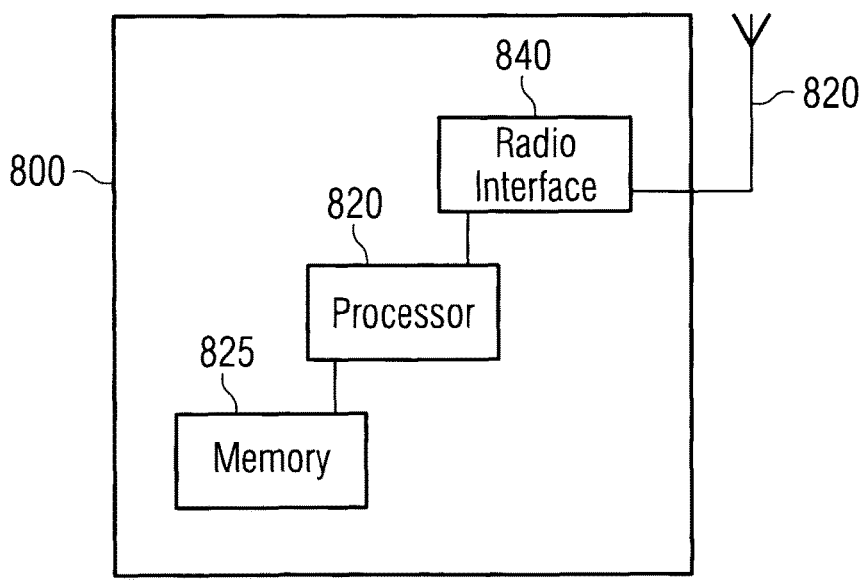
FIG. 4 schematically shows a base station.

FIG. 4 depicts an exemplary apparatus 800 for use in a base station. The apparatus may be connected to an antenna 820 for receiving via a downlink and transmitting via an uplink. The apparatus also includes a radio interface 840, which may comprise one of more of the following components such as filters, converters (e.g., digital-to-analog converters and the like), symbol demappers, an Inverse Fast Fourier Transform (IFFT) module, and the like, to process symbols, such as OFDMA symbols, carried by a downlink or an uplink. The apparatus further includes a processor 820 for controlling the base station and for accessing and executing program code stored in memory 825. It should be appreciated that the processor 820 can comprises one or more processors in practice and the memory 825 may be arranged to comprise one or more memories in practice.

Some embodiments may be performed in an LTE system and the eNB may collect the associated measurements. Some embodiments may be performed in a UMTS system and the RNC may collect the associated measurements. Of course in alternative embodiments any other suitable entity may collect the associated measurements. As mentioned previously, the UE may alternatively or additionally collect the associated measurements.

The apparatus of the base station may be configured to receive the messages sent by the UE. One or more of the steps performed by the apparatus of the base station may be performed when one or more associated instructions are run on one or more of the processors. It should be appreciated that the one or more associated instructions may be stored in one or more memories of the base station. The MDT job may be stored in one or more of the memories.

Whilst embodiments have been described in relation to MDT, it should be appreciated that other embodiments may be used with other data collection techniques. For example, embodiments may be used where data needs to be collected from one or more base stations and forwarded to a data collection entity or entity having a data collection function. The data which needs to be collected may be provided by the base stations themselves or from user equipment. Other embodiments may be used to collect data from other network elements.

Whilst embodiments have been described in relation to the LTE systems, it should be appreciated that embodiments can be used in conjunction with any other suitable standard. For example, embodiments may be used in a UMTS environment. In this alternative, the messages may be UMTS messages.

It is noted that whilst embodiments may have been described in relation to user equipment or mobile devices such as mobile terminals, embodiments may be applicable to any other suitable type of apparatus suitable for communication via access systems.

A communication device may be configured to enable use of different access technologies, for example, based on an appropriate multi-radio implementation.

It is also noted that although certain embodiments may have been described above by way of example with reference to the exemplifying architectures of certain mobile networks and a wireless local area network, embodiments may be applied to any other suitable forms of communication systems than those illustrated and described herein. It is also noted that the term access system may be understood to refer to any access system configured for enabling wireless communication for user accessing applications.

Some embodiments may find application in wired networks.

The above described operations may require data processing in the various entities. The data processing may be provided by means of one or more data processors. Similarly various entities described in the above embodiments may be implemented within a single or a plurality of data processing entities and/or data processors. The data processing entities may be controlled by one or more computer programs which may be stored in one or more memories of the apparatus.

Alternatively or additionally appropriately adapted computer program code product may be used for implementing the embodiments, when loaded to a computer or a processor. The program code product for providing the operation may be stored on and provided by means of a carrier medium such as a carrier disc, card or tape. In some embodiments, there may be the possibility to download the program code product via a data network.

Some embodiments may be implemented as a chipset, in other words a series of integrated circuits communicating among each other. The chipset may comprise microprocessors arranged to run code, application specific integrated circuits (ASICs), and/or programmable digital signal processors for performing the operations described above.

Embodiments may be practiced in various components such as integrated circuit modules.

The design of integrated circuits may be by a highly automated process. Complex and powerful software tools may be available for converting a logic level design into a semiconductor circuit design ready to be etched and formed on a semiconductor substrate.

Programs, such as those provided by Synopsys, Inc. of Mountain View, Calif. and Cadence Design, of San Jose, Calif. may automatically route conductors and locate components on a semiconductor chip using well established rules of design as well as libraries of pre-stored design modules. Once the design for a semiconductor circuit may have been completed, the resultant design, in a standardized electronic format (e.g., Opus, GDSII, or the like) may be transmitted to a semiconductor fabrication facility or "fab" for fabrication.

The foregoing description has provided by way of exemplary and non-limiting examples a full and informative description of the exemplary embodiments. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention as defined in the appended claims.

The invention claimed is:

1. A method comprising:
  collecting a first type of minimisation of drive tests (MDT) measurement for an MDT job having a configuration defining if an MDT measurement is a primary or a secondary measurement;
  only if the first type of MDT measurement is available, collecting a second type of MDT measurement, said first and second types of MDT measurements being used together by an entity; and
  causing values of said first type of MDT measurement to be sent with associated values of said second type of MDT measurement to be sent,
  wherein said value of said first type of MDT measurement is sent by a user equipment to a radio network element only if said associated value of said second type of MDT measurement is available.

2. The method as claimed in claim 1, wherein said first type of MDT measurement is the primary measurement and said second type of MDT measurement is the secondary measurement.

3. The method as claimed in claim 1, further comprising receiving information indicating for at least one type of information if that type of information is the primary or the secondary measurement.

4. The method as claimed in claim 1, further comprising causing a value of said first type of MDT measurement to be sent with the associated value of said second type of MDT measurement and additional information.

5. The method of claim 4, wherein said additional information is one or more of a time stamp, cell identity, trace reference or trace recording session reference.

6. The method as claimed in claim 1, further comprising collecting a plurality of different values of one of said first and second types of MDT measurements which are associated with one or more values of the other of said first and second types of MDT measurements.

7. The method as claimed in claim 1, wherein said first type of MDT measurement may comprise at least one of:
  power headroom measurements;
  throughput measurements;
  quality of service measurements;
  reference signal received power measurements and reference signal received quality measurements; and
  measurement data.

8. The method as claimed in claim 1, wherein said second type of MDT measurement comprises at least one of received interference power and location.

9. The method as claimed in claim 1, used when performing an MDT job.

10. A non-transitory computer readable medium including instructions to implement the method as claimed in claim 1, after the instructions are loaded to a computer or a processor.

11. An apparatus comprising at least one processor and at least one memory including computer code for one or more programs, said at least one memory and said computer code configured, with said at least one processor, to cause the apparatus at least to:
  collect a first type of minimisation of drive tests (MDT) measurement for an MDT job having a configuration defining if an MDT measurement is a primary or a secondary measurement;
  only if the first type of MDT measurement is available, collect a second type of MDT measurement, said first and second types of MDT measurements being used together by an entity;
  cause values of said first type of MDT measurement to be sent with associated values of said second type of MDT measurement to be sent; and
  cause a value of the first type of MDT measurement to be sent to a radio network element only if the associated value of the second type of MDT measurement is available.

12. The apparatus as claimed in claim 11, wherein said first type of MDT measurement is the primary measurement and said second type of MDT measurement is the secondary measurement.

13. The apparatus as claimed in claim 11, wherein said at least one memory and said computer code configured, with said at least one processor, further cause the apparatus to receive information indicating for at least one type of information if that type of information is the primary or the secondary measurement.

14. The apparatus as claimed in claim 11, wherein said at least one memory and said computer code configured, with said at least one processor, further cause the apparatus to cause a value of the first type of MDT measurement to be sent with the associated value of the second type of MDT measurement and additional information.

15. The apparatus as claimed in claim 14, where said additional information is one or more of a time stamp, cell identity, trace reference or trace recording session reference.

16. The apparatus as claimed in claim 11, wherein said at least one memory and said computer code configured, with said at least one processor, further cause the apparatus to collect a plurality of different values of one of said first and second types of MDT measurements which are associated with one or more values of the other of said first and second types of MDT measurements.

17. The apparatus as claimed in claim 11, wherein said first type of MDT measurement may comprise at least one of:
 power headroom measurements;
 throughput measurements;
 quality of service measurements;
 reference signal received power measurements and reference signal received quality measurements; and
 measurement data.

18. The apparatus as claimed in claim 11, wherein said second type of MDT measurement comprises at least one of received interference power and location.

19. A user equipment comprising the apparatus as claimed in claim 11.

20. A radio network element comprising the apparatus as claimed in claim 11.

* * * * *